United States Patent
Von Hoyningen-Huene et al.

(10) Patent No.: US 11,134,133 B2
(45) Date of Patent: Sep. 28, 2021

(54) COMMUNICATION METHOD

(71) Applicant: Robert Bosch GmbH, Stuttgart (DE)

(72) Inventors: Johannes Von Hoyningen-Huene, Sindelfingen (DE); Andreas Selig, Lohr Am Main (DE); Stephan Schultze, Lohr-Wombach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/887,248

(22) Filed: May 29, 2020

(65) Prior Publication Data

US 2020/0396308 A1    Dec. 17, 2020

(30) Foreign Application Priority Data

Jun. 14, 2019    (DE) ..................... 10 2019 208 678.0

(51) Int. Cl.
| | |
|---|---|
| *G06F 15/16* | (2006.01) |
| *G06F 9/54* | (2006.01) |
| *H04L 29/06* | (2006.01) |
| *H04L 29/08* | (2006.01) |
| *G05B 19/418* | (2006.01) |

(52) U.S. Cl.
CPC ...... *H04L 67/2833* (2013.01); *G05B 19/4185* (2013.01); *H04L 67/108* (2013.01); *H04L 67/26* (2013.01)

(58) Field of Classification Search
CPC .................................................. H04L 67/2833
USPC ....................................................... 709/223
See application file for complete search history.

(56) References Cited

U.S. PATENT DOCUMENTS

| | | | |
|---|---|---|---|
| 2007/0286211 A1* | 12/2007 | Toyomura | H04L 12/66 370/395.64 |
| 2011/0228883 A1* | 9/2011 | Liu | H04L 1/0045 375/341 |
| 2016/0373221 A1* | 12/2016 | Michael | H04L 5/0044 |
| 2017/0041225 A1* | 2/2017 | Zheng | G06F 12/08 |
| 2018/0054703 A1* | 2/2018 | DeLuca | H04W 4/021 |
| 2019/0072940 A1* | 3/2019 | Schnabel | G05B 19/4148 |
| 2019/0182304 A1* | 6/2019 | Fok | H04L 65/607 |
| 2019/0349433 A1* | 11/2019 | Smith | H04L 61/1505 |
| 2020/0166577 A1* | 5/2020 | Walder | G01R 31/367 |
| 2020/0195539 A1* | 6/2020 | Sivaraj | G06N 20/20 |
| 2020/0304821 A1* | 9/2020 | Davis | H04N 21/6582 |
| 2020/0322180 A1* | 10/2020 | Meier | H04L 12/40163 |

* cited by examiner

*Primary Examiner* — Hamza N Algibhah
(74) *Attorney, Agent, or Firm* — Maginot, Moore & Beck LLP

(57) ABSTRACT

A communication method between subscribers of a network having multiple components of a mechatronic system, wherein payload data are communicated between the subscribers via the network by messages, and payload data of multiple subscribers are combined in a sum frame message and the sum frame message is sent to the subscribers. To use network resources more efficiently, a configurable routing structure is used to route the messages, said routing structure containing at least one partial route, and at least one partial message pertaining to this partial route is composed that, as a sum frame partial message, contains just payload data from subscribers of this partial route, the sum frame partial message is routed via this partial route and subscribers of the partial route can each extract their payload data from the sum frame partial message and/or write said payload data to the sum frame partial message.

15 Claims, 9 Drawing Sheets

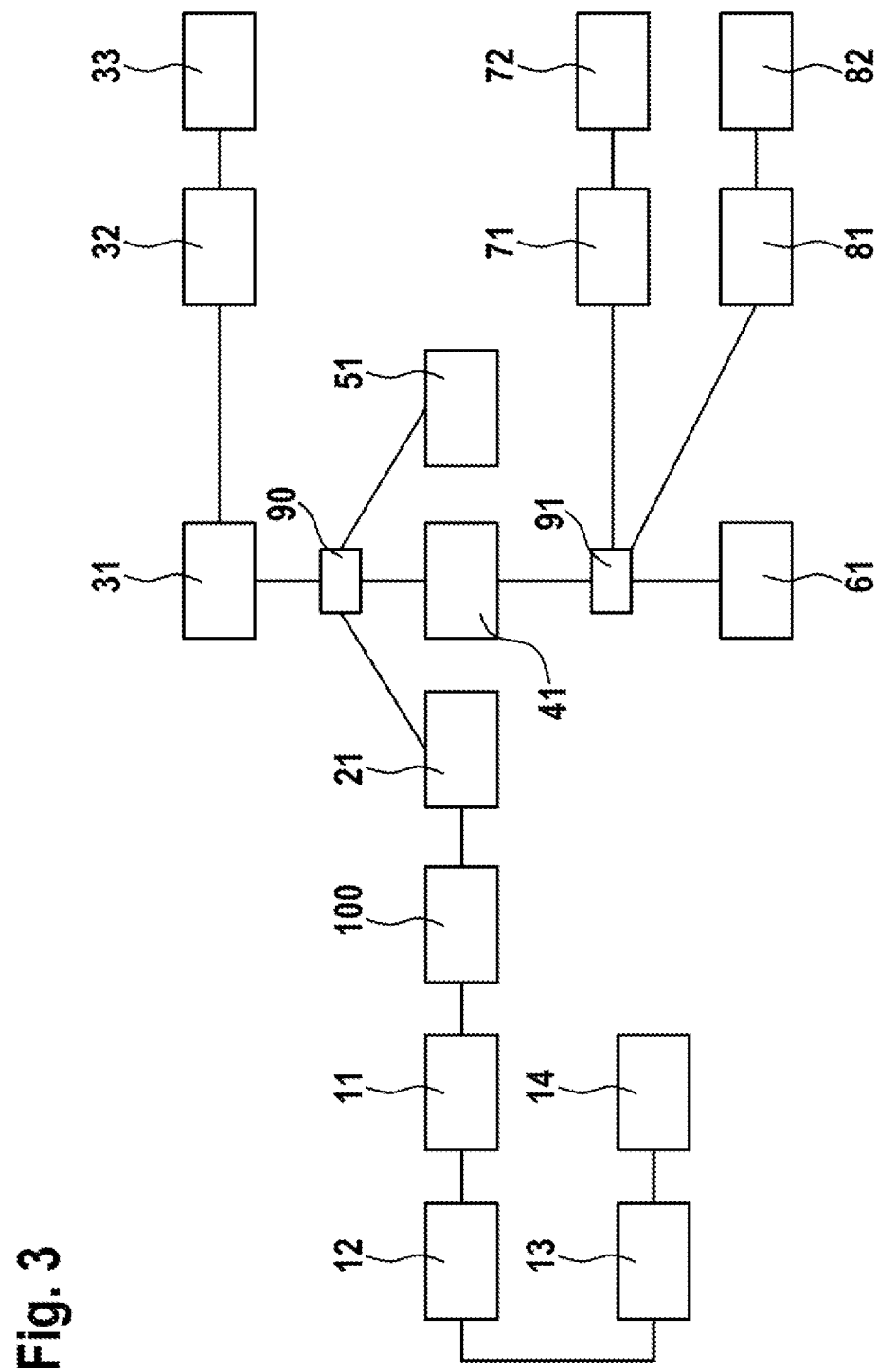

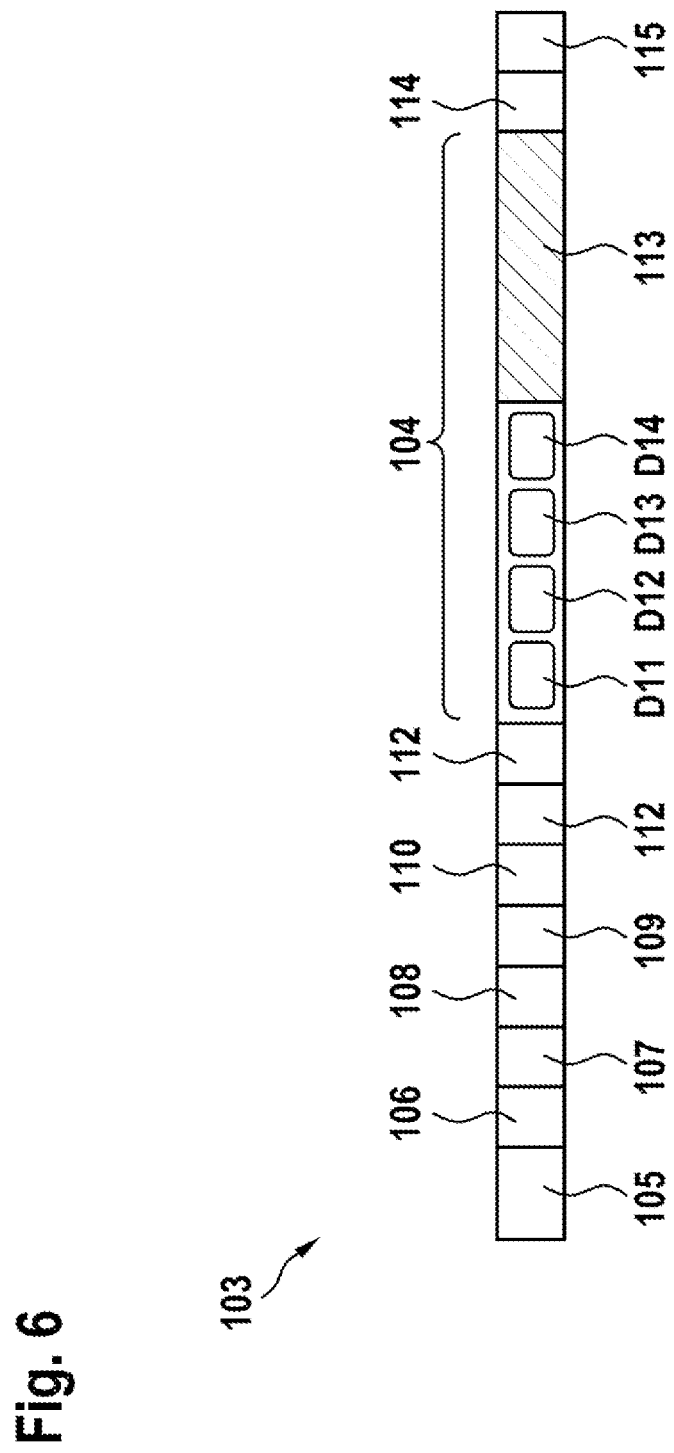

COMMUNICATION METHOD

This application claims priority under 35 U.S.C. § 119 to application no. DE 10 2019 208 678.0, filed on Jun. 14, 2019 in Germany, the disclosure of which is incorporated herein by reference in its entirety.

BACKGROUND

The present disclosure relates to a communication method between subscribers of a network that has multiple components of a mechatronic system, in particular controllers and drive controllers of an industrial automation installation, wherein payload data are communicated between the subscribers via the network by means of messages, and logical and/or physical communication connections between subscribers of the network exist that are used to transmit the messages, and payload data of multiple subscribers are combined in a sum frame message and sent to subscribers of the network.

Such a method is known in the prior art. There is e.g. provision for the data that are to be transmitted from a control device to field devices to be transmitted in a single sum frame divided into data fields and for the data that are to be transmitted from a multiplicity of field devices to a control device likewise to be transmitted in only one common sum frame divided into data fields.

SUMMARY

As the number of field devices increases, the sum frames inevitably become increasingly large, as a result of which the method becomes increasingly inefficient.

It is therefore an object of the disclosure to make the method more efficient overall, in particular to use the network resources more efficiently and/or to ensure slimmed-down network traffic. In particular, the disclosure is supposed to render the network infrastructure capable of demanding tasks for open-loop and closed-loop control of a mechatronic system, in particular with a flexible number or with a multiplicity of components. Finally, the disclosure is in particular supposed to help to flexibly map a required system configuration for a mechatronic system onto a communication architecture for payload data.

These objects are each achieved in part or in full by a method, by a message data structure, by a mechatronic system, by a machine controller and by a computer program product according to the disclosure.

The disclosure affords the advantage that it makes the communication method cited at the outset much more efficient. Better use is made of the available network resources and distinctly slimmed-down network traffic is ensured. With reference to a mechatronic system, an available network infrastructure that, per se, is not necessarily envisaged for automation tasks, or not envisaged exclusively for automation tasks, is nevertheless rendered able to use a communication of payload data for the open-loop and/or closed-loop control of a mechatronic system. A mechatronic system of this kind is distinguished in particular in that the control and drive components are flexibly configurable and in particular combinable in large numbers and with a great deal of variability. Such control and drive components can then also be controlled or automatically controlled in real time, which in turn places increased demands on the quality of service of the communication. The disclosure ensures that a system configuration of the aforementioned mechatronic system is flexibly implemented by means of a communication architecture for payload data, so that extremely high demands—through to realtime demands of an industrial automation system—can be met with limited network resources also and in particular.

The disclosure achieves these and a number of further advantages in that the concept of a sum frame, known from industrial communication, for example in the case of fieldbuses, is used for network messages and is definitively improved by virtue of a configurable routing structure and messages optimized in accordance with the routing structure being able to be used; this is consistent with optimized communication route planning. The topology or routing structure prescribed thereby is used to adapt the sum frame of the sum frame messages, so that the structure and/or content of sum frame messages reflect the topology or the routing structure of the network configuration used.

The reason is that sum frame partial messages are composed that already take into consideration the network topology and/or the network routes used or configured for these very sum frame partial messages.

A routing structure is configured on the basis of a—in particular predefined or previously known—communication topology or network topology for subscribers. A routing structure can contain routes to one or more subscribers, along which the network messages envisaged for the transmitted subscribers or these subscribers are directed. The disclosure achieves the aforementioned objects in that firstly the messages are routed via the configurable routing structure and secondly this routing structure contains at least one partial route, but in particular multiple partial routes. A partial route covers just a portion of the subscribers of the network; this can mean that not all but rather just a (genuine) subset of the subscribers of the network are reached via this partial route. A further insight of the disclosure is that the efficiency of the network communication can be definitively improved if a message referred to as a sum frame partial message here is defined/configured/composed for such a partial route. This sum frame partial message contains payload data, in particular just payload data, from subscribers of precisely this partial route. This can involve (over time) at least one, some, in particular selected, or even every subscriber(s) of this partial route being able to have a timeslot (slot) within the relevant sum frame envisaged for it flexibly.

If the relevant sum frame partial message is routed via this partial route, the aforementioned subscribers of this partial route can therefore each extract the payload data envisaged for them from the sum frame partial message and/or write their payload data to the sum frame partial message (in particular given bidirectional communication or—for example analogously to a fieldbus architecture—to provide a dedicated return channel).

The disclosure uses a sum frame method (usually a transmission method in the case of fieldbuses, but not limited to fieldbuses for the purposes of the disclosure). For this sum frame method, the subscribers are connected to one another in a specific, logical topology (for example a ring topology in the case of fieldbuses). According to the disclosure, it may also be important for the topology to be deterministic and known for the routing or composition of the sum frame messages or sum frame partial messages. The topology can also be flexibly configurable, and is then preferably stipulated in the respective configuration such that the routing and/or composition of the sum frame partial messages is performable deterministically. The data are preferably distributed in sequential succession from subscriber to subscriber along the envisaged route or partial route. Based on a sum frame partial message, the data block contained has the data for subscribers (preferably all the subscribers) along the assigned partial route. This renders the method highly available and deterministic. Optionally, there can be provision for a loopback, which achieves the effect that an acknowledgement is provided (e.g. via the aforementioned return channel) about the transfer/acceptance of the subscriber data to/from the respective correct subscriber(s) of the partial route.

A sum frame message can be in the form of a single network message (data packet) that is composed and routed individually—for example based on the OSI model (Open Systems Interconnection model)—and that has the payload data of multiple subscribers in combined and structured form in its payload data area. Such a sum frame message or sum frame partial message therefore permits selective random access, according to need, to the payload data of single or all individual subscribers within its payload data area. Nevertheless, it is a single message, which means that sum frame partial messages for dedicated network paths or dedicated partial routes are thus formed that serve multiple subscribers at the same time and need to be transmitted or routed only once.

According to the disclosure, the mechatronic system has at least one controller, in particular. The mechatronic system furthermore firstly has mechatronic components, that is to say for example electrical components, electronic components, hydraulic components, mechanical components, pneumatic components or components combined from these principles or other components, that are combined in a system installation and as such act as a combined mechatronic unit or mechatronic machine. This can be a machine tool, for example, in which multiple electric motors form the axes of the machine tool. Components of the mechatronic system are preferably co-ordinated, if necessary synchronized, and controlled as a system installation by one or more (machine) controllers. The machine controller is for example a logic controller, such as for example a programmable logic controller (PLC), a motion controller, such as for example a CNC (computer numeric control) or—in general terms—a superordinate system controller, which can also be compiled from multiple different control platforms and architectures. The machine controller can be an integrated machine controller that also incorporates a realtime component, in software or hardware, and a superordinate logic controller, process controller or general controller in a unit, preferably in a housing.

Such a machine controller can be a separate and dedicated piece of hardware, that is to say for example an electronic component of the mechatronic system that is embodied as a physical machine controller. It can alternatively be an embedded controller or a virtual controller, for example emulated or virtualized on an industrial PC. A controller can finally also be implemented as a software application on an (industrial) PC.

The disclosure broadens the sum frame method by splitting a more complex routing structure into partial routes that have appropriately assigned sum frame partial messages. This also renders a multiplicity of complex topologies (accordingly mechatronic systems having a high level of complexity, for example a multiplicity of machine controllers) deterministically, in particular quickly and flexibly, capable of industrial communication—in particular realtime communication—of payload data.

The essence of the disclosure also covers the circumstance that, in the case of—in particular more complex—realtime-compatible network systems such as TSN topology structures, there are guidelines concerning how the partial messages—in particular with reference to the network topology—are combined in optimum fashion. This optimization is transmitted to all network subscribers as a communication configuration. This is discussed in even more detail later on.

The deterministic and at the same time slimline communication method according to the disclosure is particularly suitable for rendering a network-based, mechatronic system capable of network-wide realtime tasks by means of the disclosure. To this end, it is proposed that the payload data comprise realtime data relating to the mechatronic system. In particular, these are open-loop and/or closed-loop control data, that is to say for example default setpoint values, measured values, sensor parameters or sensor data, but also data reported via a return channel according to the disclosure, such as e.g. instantaneous actual values. Realtime data of this kind are communicated between envisaged subscribers in real time. In particular, the control data are communicated in real time by means of the TSN standard of a realtime-compatible Ethernet (preferably according to IEEE 802.1Q). In particular, the control data are communicated in real time according to realtime classes 0 (Best Effort), 1 (Background) and 2 (Excellent Effort) from IEEE 802.1Q, and for demanding production tasks and for motion control or for machine tool controllers also according to realtime class 3 (Critical Applications).

With reference to the aforementioned TSN architecture, the use of a publish/subscribe communication model according to OPC-UA is preferred. A characteristic of a publish/subscribe architecture of this kind is that the publisher does not individually address and therefore does not necessarily "know" the subscriber(s). The multicast incarnation has provision for a network message, which comprises a sum frame partial message according to the disclosure, for a plurality to a multiplicity of subscribers of the assigned partial route. A unicast incarnation has provision for a network message only for one or more, specific subscribers. This then accordingly also applies to the applicable network messages composed in accordance with the sum frame partial messages.

The communication architecture can also correspond to a fieldbus architecture, specifically in particular a master/slave architecture, in particular SERCOS IEC 61491. A linear or ring topology is then preferably used. In particular in the case of fieldbuses, a more complex topology can be compiled from linear or ring topologies of this kind.

With reference to the disclosure, real time means in particular that realtime tasks are executed and communicated using a deterministic clock cycle. In the case of a machine tool, for example, this can mean that the machine controller or motion controller transmits or receives setpoint values for an actuated tool and approaches said values by means of an integrated interpolator that generates position values for a path of movement of the tool from the setpoint values of the CNC program using an interpolator clock and transfers said position values as current setpoint value defaults to connected drive controllers to approach the applicable interpolator position of the resultant path of movement. The reaction time of the applicable application is specific to the application. For machine tool controllers, reaction times of between 1 and 1000 µs, in particular 1 and 100 µs, are typically customary. In the case of applications that are less demanding on timing—such as for example packaging machines—there can also be provision for reaction times of between 1 ms and 100 ms. The same applies to the associated cycle times of the communication clock cycle. The disclosure firstly comprises hard real time, which does not permit the reaction time to be exceeded. The result of this is that, in particular in the case of hard real time, an increase in the cycle time of the communication can be critical. The disclosure takes this into consideration by providing for a flexible routing structure—in particular matched to the characteristic realtime demands—and permissible parameters for the composition of sum frame partial messages, such as for example a maximum possible total length or a maximum number of payload data slots in accordance with the number of possible devices communicating with one another. In addition, soft real time and a fixed real time are also possibilities. In all of these realtime applications, the disclosure safeguards the communication of the payload data within the bounds of the characteristic demands, so that the performance of the realtime tasks and in particular the network-wide integrity of the real time is maintained overall.

The entire network or a physically or logically separate network segment can already reproduce a mechatronic system or correspond to a mechatronic system of this kind. In order to obtain a flexible and slimline communication structure, the entire network or the predetermined network segment is covered by multiple partial routes of the routing structure, the respective associated sum frame partial messages of all partial routes being able to collectively reproduce the payload data of the subscribers of the entire network or of the entire network segment. The partial routes are in particular logically and/or physically defined or delimited (for example by network infrastructure components such as switches). This allows the communication—in particular on the infrastructure components—to be structured particularly simply and inherently as prescribed by the network topology.

A hierarchically structured, clear communication infrastructure of simple design is achieved in that there is provision for a message sender that generates the sum frame partial messages and addresses and sends them to the subscribers via respective associated partial routes. Such a message sender can be a hardware or software module or a component of a controller or of an industrial PC, for example. In particular, a publisher based on the publish/subscribe communication model or a master of a master/slave fieldbus architecture or a server of established client-server connections can act as such a message sender. In that case, all sum frame partial messages or just the sum frame partial messages from bordering partial routes are then composed and sent along the associated partial routes. To this end, the routing structure and the communication-relevant data of the relevant subscribers are preferably known in the message sender. The subscribers can also be variably configurable, so that a subscriber (for example a controller) can be configured either as a message sender or as an addressee.

There are a multiplicity of different options for the implementation or compilation according to the disclosure and for the routing of the sum frame partial messages according to the disclosure. Without restricting the generality, two variants preferred according to the disclosure are described below.

Efficient routing, in particular under relatively low load from the network resources, low equipment involvement on the network and a simple network structure and/or comparatively short single messages are achieved by virtue of the sum frame partial messages sent passing through the routing structure to the addressed subscriber(s) without alteration. In this case, a sender (for example a master or a primary station or a publisher in the above sense) preferably generates already complete sum frame partial messages that are each envisaged for a partial route. Since the network or network segment consists of multiple partial routes (which for their part can in turn have subsidiary partial routes), single sum frame partial messages are generated for dedicated single partial routes. Since these sum frame partial messages for dedicated single partial routes contain just the payload data of the subscribers of the envisaged single partial routes, the messages or data packets are normally relatively small. In this case too, sum frame partial messages of an envisaged partial route can be routed via one or more other routes or partial routes or multiple or other subscribers of the network for which the relevant sum frame partial message of the envisaged partial route contains no payload data. Said sum frame partial message is routed via the aforementioned routes, partial routes or subscribers of the network merely to reach the envisaged (end) partial route. Since, in addition, the generated sum frame partial messages pass through the routing structure without alteration, no involvement is produced for handling the messages during passage through the network. If the optimization is supposed to take place such that the master already generates and sends all the necessary messages, a message structure as depicted in FIG. 5B is obtained (in this regard, see later on).

The number of sum frame partial messages to be generated in a transmitter, for example, is decreased and hence the applicable resources of the transmitter are saved if the sum frame partial messages are restructured in accordance with the partial routes and the restructured sum frame partial messages are forwarded with the payload data to the subscribers addressed therein. A transmitter can then generate sum frame partial messages that already contain the payload data of multiple or even all partial routes—in particular the partial routes that correspond to a network branch or network segment to which the applicable sum frame partial message is transmitted—for example. It is therefore possible—in particular at network infrastructure components of the routing structure—for the applicable sum frame partial messages to be broken down according to payload data of the addressed subscribers contained and for derived further sum frame partial messages to be generated for subsequent partial routes. Similarly, sum frame partial messages can also be fragmented and/or recombined in accordance with the above. The sum frame partial messages are forwarded, in particular using the store-and-forward method, with the payload data to the subscribers addressed therein. To this end, the network infrastructure components (or the other components that perform the restructuring) have an applicable network functionality and the analysis option, a memory and also computing capacity and the requisite interfaces, in order to structure the sum frame partial messages and direct them as indicated above; for this purpose, the network infrastructure components can be controllers (for example master controllers), industrial PCs or else simple switches, in particular. Overall, messages are forwarded using the store-and-forward method in the proposed design—in particular in infrastructure components. When forwarded, the content of the messages is recombined/split again in a different manner, the payload data to be transmitted remaining unaltered.

The routing structure and/or the partial routes and/or the associated configuration of the respective sum frame partial messages is/are preferably predetermined or is/are prescribed by the user; they can also be ascertained in automated fashion using the known network mechanisms and applicable functionalities of a controller or of an industrial PC, for example. The routing structure and/or the partial routes with the configuration of the respective associated sum frame partial messages is/are transmitted to—in particular all—subscribers of the network and used there for routing and/or extracting and/or writing the payload data. A—or all—subscriber(s) know(s) in particular which partial route or which combination of partial routes can be used to reach another subscriber; at the same time, the composition of the sum frame partial messages is also known, so that the relevant subscriber can both deterministically send payload data to other subscribers by means of the mechanism according to the disclosure and deterministically find, write or read its payload data (e.g. addressed to it) in a sum frame partial message that contains said payload data. This mechanism also works the other way around, so that generally the subscriber or each subscriber has all the information available in order to extract its own payload data and/or deterministically address and send payload data to any other subscribers. In particular, the configuration for the payload data contained, which are distinguished according to addressed subscribers, is also included with the configuration, so that the arrangement of the payload data in a sum frame partial message is deterministic and known overall.

Such a known routing structure and/or such well-known partial routes can in particular be communicated throughout the network or throughout the network segment by means of a module, for example by means of a configuration module of the network (which is contained in a controller or an industrial PC, for example). Such a configuration module can also perform a dual or multiple function. As such, flexible setup of the network or of network parts or flexible applicability of the disclosure to different network topologies is facilitated by virtue of a configuration module of the network using the routing structure to determine the configuration of the sum frame partial messages, in particular the composition thereof and/or the transmission times thereof, furthermore in particular in automated fashion. The known or automatically ascertained routing structure prescribes the configuration or the composition and/or transmission times of the requisite sum frame partial messages. In particular, the composition and/or the transmission times of the different sum frame partial messages is/are determined by the stipulation of the routing structure together with the routing structure method. In particular, messages containing data for multiple subscribers are "broken down" or "combined" in the opposite direction, and forwarded, in infrastructure components (switches) or else in (other) subscribers such that optimization of the partial messages in summation frames (sum frames) is achieved for the respective topology sections. The configuration (message composition, message transmission times) of the data messages is transmitted from the configurator (configuration module) to the individual slaves. The configurator can be a tool that works offline or—as e.g. very specifically possible with Sercos—a code working online, in the master or in a slave.

The routing structure can be configured differently for one and the same network structure or network topology. A particularly high level of variability is ensured by virtue of the routing structure being prescribed by the user. The disclosure becomes particularly easy to handle and, in the extreme case, even configurable by means of plug & play by virtue of the structure being ascertained in at least partially automated fashion, in particular at runtime; this can involve in particular the use of subscriber neighborhood detection using the LLDP (Link Layer Discovery Protocol). This is a manufacturer-independent OSI layer 2 protocol defined in the IEEE 802.1 AB standard that permits information to be interchanged between adjacently arranged network subscribers and hence the structure and topology of the network to be ascertained automatically—for example on initialization or automated startup. When this or another protocol permitting the network structure to be ascertained in automated fashion is used, it is preferred for network subscribers—in particular all network subscribers—to support the applicable protocol.

The routing structure—or the network or a network segment—consists of multiple partial routes that can each have different topologies or profiles. By way of example, there can be provision for partial routes as a linear section or in a star structure. The network can then be structured flexibly and according to need and is nevertheless still rendered capable of automation tasks by the disclosure. To this end, it is proposed that the routing structure has at least one linear section with a line end subscriber and/or a line start subscriber, involving subscribers being arranged in sequential succession. This means that the subscribers of a linear section communicate with one another sequentially in the direction of the line. According to the disclosure, sum frame partial messages are generated that pass through a linear section without alteration, for example. Such sum frame partial messages then have the payload data e.g. of all network subscribers belonging to the linear section.

In addition, there can alternatively or additionally be provision for one or more star sections, a star section involving star branches with subscribers being connected to a node in a star shape. This can mean that multiple subscribers are connected to one node in a star shape. A star branch can also form a linear section in the sense outlined above. A node is realized in particular by means of a network infrastructure component and/or by means of a publisher based on the publish/subscribe communication model and/or by means of a master of a master/slave fieldbus architecture and/or by means of a server of established client-server connections. The routing structure can have a combination of one or more linear sections and one or more star branches. All in all, this achieves a high level of structure flexibility for the network topology, according to the disclosure.

If sum frame partial messages that pass through a linear section are routed by each line subscriber without alteration, this has the advantage that the network communication takes place more quickly. If sum frame partial messages are alternatively or additionally routed to nodes, these are either routed to a star branch without alteration or restructured and then routed to a star branch. By way of example, in a simple configuration, two star branches that both open into a linear section can set out from one node. The sum frame partial message routed onward from these nodes can then be broken down at the node into one sum frame partial message having all the payload data of one linear section and another having all the payload data of the other linear section.

Some or all of the objects cited at the outset are achieved—at least in part—by a message data structure of a network that can be used to communicate payload data between subscribers of the network along a preconfigurable route assigned to the message data structure. The communication takes place in particular using a method according to the disclosure. The network has multiple components of a mechatronic system, in particular controllers and/or drives of an industrial automation system. The message data structure has a configurable payload data section (corresponding to a timeslot of the envisaged message structure) that contains payload data just from subscribers of the assigned route. The message data structure is envisaged in particular for an industrial automation system, wherein the payload data can be control data and/or drive data, for example sensor actual values or drive setpoint values, that are generated and communicated by a controller in real time.

The objects cited at the outset are achieved at least in part by a mechatronic system, in particular an industrial automation system having controllers and drive controllers, within which payload data that relate to the electronic system and in particular originate from components of the mechatronic system are communicated by means of a method according to the disclosure, in particular using a message data structure according to the disclosure. A mechatronic system of this kind is for example a combination of drives and controllers that communicate—preferably in real time—using a mechanism according to the disclosure. A mechatronic system of this kind can be a control and drive system of a machine, such as for example a printing machine, a packaging machine or a machine tool or a machine tool installation.

In addition, the objects cited at the outset are achieved at least in part by a machine controller of a mechatronic system, in particular an industrial automation system having controllers and drive controllers, which carries out a communication method according to one of the disclosure—in particular using a message data structure according to the disclosure. The machine controller in particular provides for a configuration or at least partially automated ascertainment of the routing structure and/or obtains such a configuration or partial configuration from the network and/or communicates or distributes such a configuration in the network. This firstly allows deterministic communication by means of sum frame partial messages composed according to the disclosure and secondly simplifies the updating and distribution of the configuration.

Finally, the disclosure relates to a computer program product for a computer device, in particular for a machine controller which, when executed on a computer device, carries out a method according to the disclosure, in particular using a message data structure according to the disclosure.

BRIEF DESCRIPTION OF THE DRAWINGS

The disclosure is explained in highly schematic fashion on the basis of exemplary embodiments and drawings. In the drawings, features that are the same or that have the same function are provided with the same reference signs, unless indicated otherwise in the description. The technical design features shown in a figure are applicable to any variant of the disclosure, specifically even independently of other features contained and/or described in said figure, for example, unless some other explicit explanation is given in relation to said figure or said design feature. In the drawings:

FIG. 3 shows a complex mechatronic system with a combination of multiple star sections and multiple linear sections in a schematic block diagram, FIG. 6 shows a message data structure, based on an Ethernet message composition according to IEEE 802.1 or according to the OSI model.

DETAILED DESCRIPTION

Figure 1A:
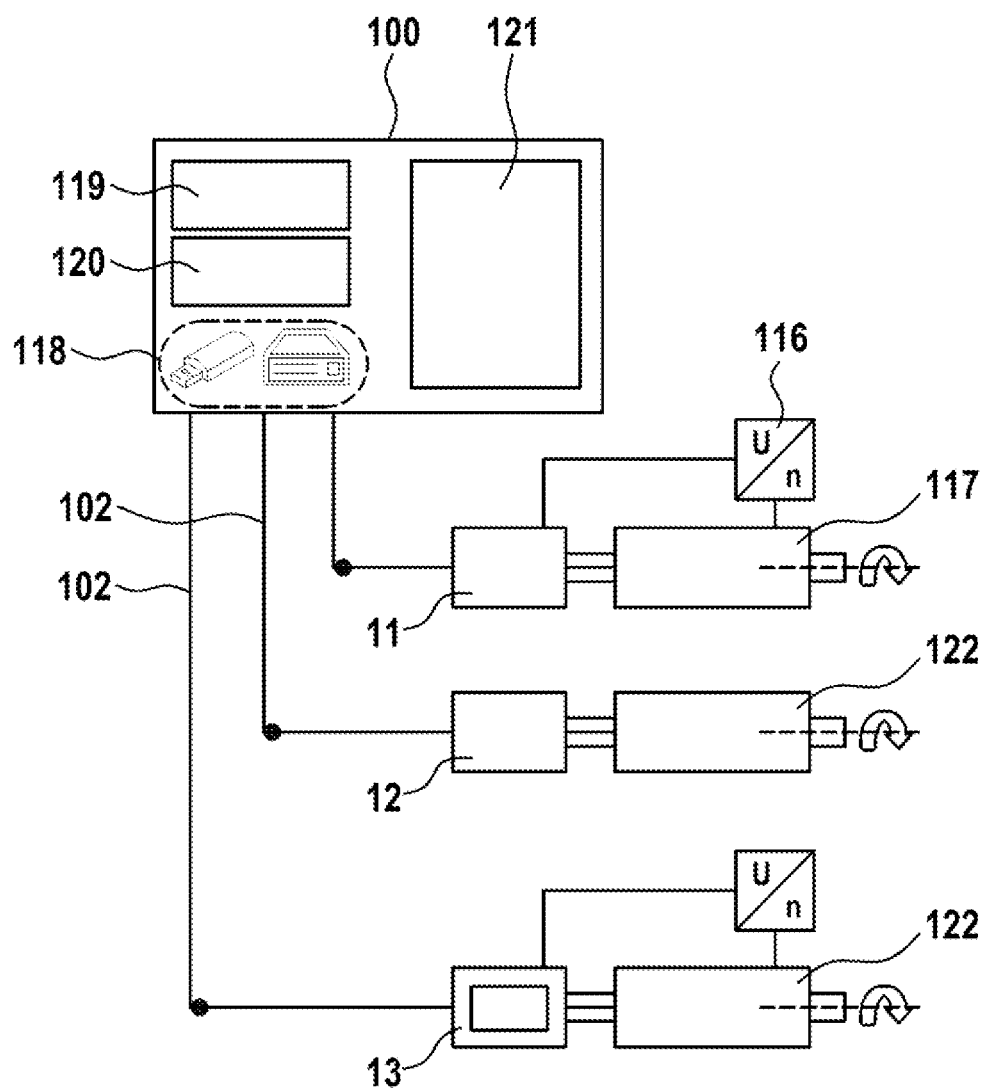
FIG. 1A shows a mechatronic system with a controller and three axes driven by means of drive controllers.

Referring to FIG. 1A, a mechatronic system 10 is schematically depicted that has, as subscribers, a controller 100, physical communication connections 102, for example Ethernet network cables, and three drive controllers 11, 12, 13, which are connected to produce a network 101. In the case below, the abstract term "subscriber" is used interchangeably with the respective components representing the subscriber, such as for example a controller, an industrial PC, a drive controller or a network switch. The controller 100 has an integrated logic controller 119 (for example a programmable logic controller PLC), an integrated path controller 120 (for example a machine tool controller CNC, computer numeric control), integrated mass memories 118, for example a hard disk, an SSD and/or a connection for a mobile storage device, such as for example a USB stick. In addition, the controller 101 has a display 121, which can be a touchscreen.

The controller 100 in the exemplary embodiment shown can be in the form of a head controller or master (primary device) of an automation installation, which can be used for automating or operating an industrial application, such as for example a machine tool. For the purpose of driving the axes, the respective drive controllers 11, 12, 13 (slaves or secondary devices) are present, the drive controller 13 also being able to have an integrated controller, which is symbolized by a rectangle incorporated in the drive controller 13. The drive controllers 11, 12, 13 each use a three-phase line to act on an associated electric motor 117, 122. The electric motor 117 is in the form of a servomotor 117, which uses feedback 116 to report a motor speed or an angle position or, generally, its rotor position to the drive controller 11 as a respective actual value.

Figure 1B:
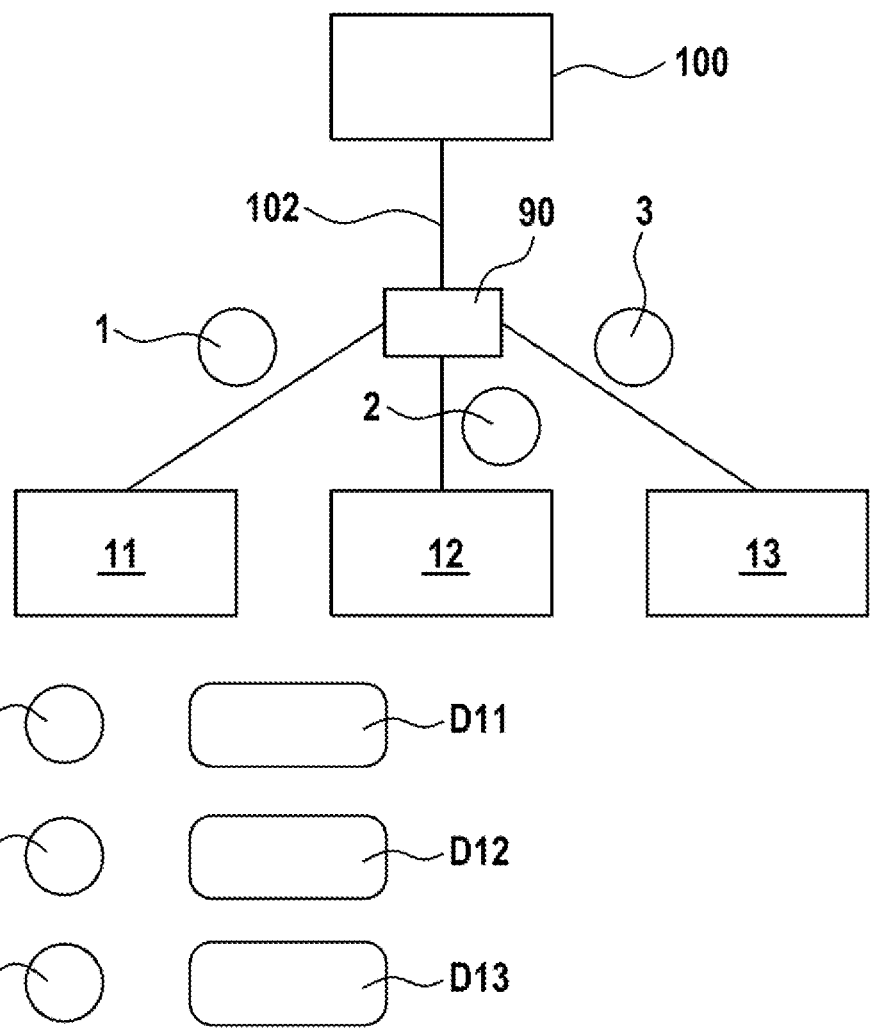
FIG. 1B shows a mechatronic system in a highly schematic depiction with five network subscribers and a star structure, and network messages depicted in highly schematic simplified fashion.

FIG. 1B shows a somewhat abstracted version of a simple variation of the mechatronic system 10 of FIG. 1A in a block diagram, with a controller 100, three drive controllers 11, 12, 13 (the axes or electric motors having been omitted in the block diagram for the sake of improved clarity) and additionally a network switch 90, connected to the controller 100 and all three drive controllers 11, 12, 13 via the communication connection 102, as a network infrastructure component. The network switch 90 represents a star point in this mechatronic system 10 of relatively simple design. For the sake of clarity, the branch points 1, 2, 3 and, below the depiction of the mechatronic system 10, the messages 1, 2, 3 routed at the branch points 1, 2, 3 with their payload data D11, D12 D13 are depicted at each of the branch locations. The payload data D11, D12, D13 are communicated or routed along the branch points 1, 2, 3 by means of messages, according to the disclosure. In this exemplary embodiment, each message contains just the payload data D11, D12, D13 relating to one subscriber 11, 12, 13. FIG. 1B depicts just the payload data D11, D12, D13 for the messages 1, 2, 3 for the sake of simplicity, said payload data being added to a network message at a timeslot section envisaged explicitly for these payload data D11, D12, D13 in the respective network message, however.

Figure 2A:
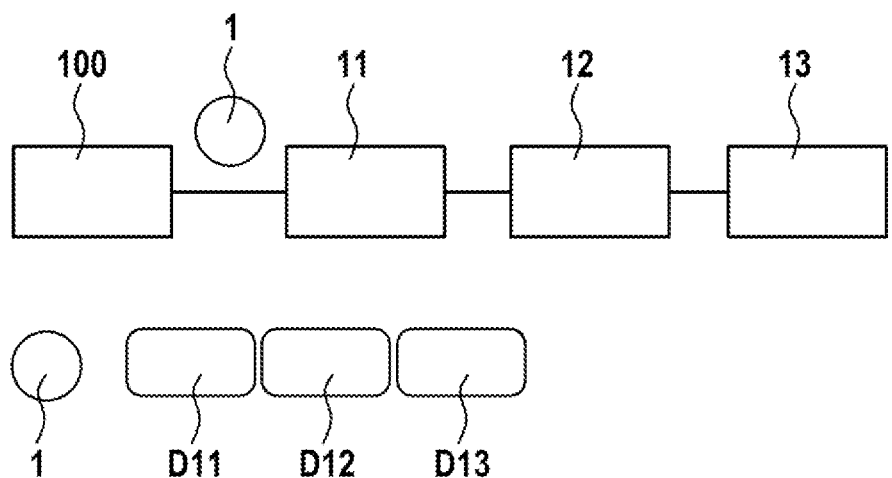
FIG. 2A shows a further mechatronic system, depicted in highly schematic fashion, with just one linear section and the associated message or the associated, schematically depicted, message structure with a corresponding routing point.

FIG. 2A shows a further, schematically depicted, mechatronic system 10 having just a linear section. The controller 100 is followed along the direction of the line by three subscribers 11, 12, 13, which form the network 101 and, to this end, are connected to one another via communication connections 102—as in the other exemplary embodiments also. The controller 100 generates sum frame messages 1 that have the composition as shown in FIG. 2A below at the branch point that the linear structure follows. The payload data section of a sum frame message or of a sum frame partial message 1 has the payload data D11, D12, D13 in combination.

Figure 2B:
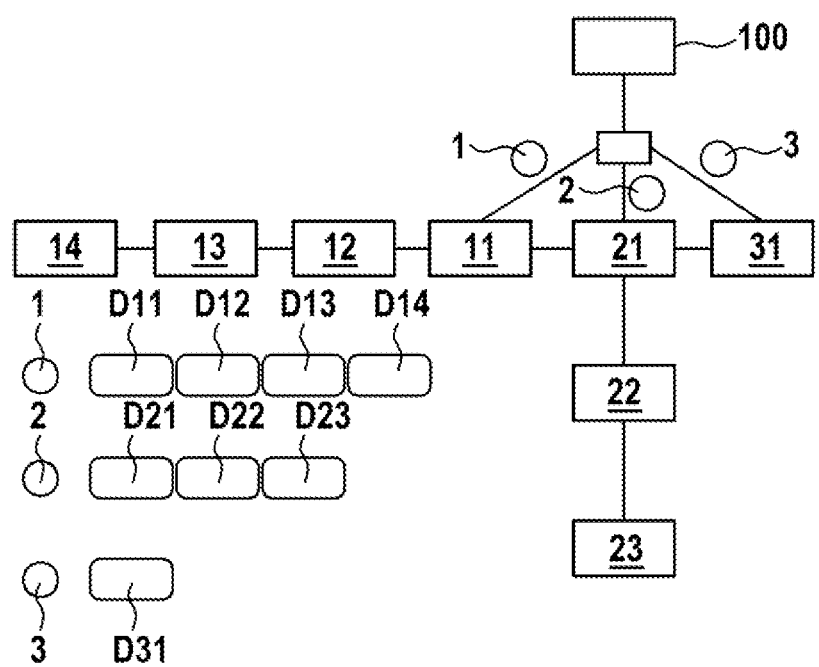
FIG. 2B shows a mechatronic system with a combination of a star section with a node and multiple linear sections, wherein the routing points are indicated with the appropriately composed sum frame partial messages.

FIG. 2B shows a mechatronic system 10 with a combination of a star section, which is formed by a node 90 in the form of a network switch, and three linear sections, which connect multiple subscribers to the controller 100 via the node 90. Specifically, the controller 100 (which can also be regarded as a 4th linear section having just one subscriber, namely the controller 100) is connected directly to the switch 90, via which a further three subscribers 11, 21, 31 are connected that each form a linear section R1, R2, R3 of the network structure. At the same time, the subscriber 21 can also be regarded as a node that connects the node 90 and the subscribers 11, 22, 31 in the style of a star section.

It can be seen from FIG. 2B that sum frame partial messages 1, 2, 3 are routed via the network structure at the branch points 1, 2, 3, the sum frame partial messages 1, 2, 3 each combining the payload data D11, D12, D13, D14; D21, D22, D23; D31 of multiple subscribers 11, 12, 13, 14; 21, 22, 23; 31. An appropriate routing structure is presented, via which the messages 1, 2, 3 shown are routed. The routing structure is configurable and, in the exemplary embodiment shown, structured such that it contains three linear partial routes R1, R2, R3. Each of the partial routes R1, R2, R3 covers just a portion of the subscribers 11, 12, 13, 14; 21, 22, 23; 31. Specifically, the sum frame partial message 1 covers the payload data D11, D12, D13, D14 of the applicable subscribers 11, 12, 13, 14 of the partial route R1; the sum frame partial message 2 covers the payload data D21, D22, D23 of the subscribers 21, 22, 23 of the partial route R2, and the sum frame partial message 3 covers just the payload data D31 of the subscriber 31 of the partial route R3. In the exemplary embodiment shown, this is accomplished by virtue of the sum frame partial message 1 being routed via the partial route R1, the sum frame partial message 2 being routed via the partial route R2 and the sum frame partial message 3 being routed via the partial route R3. For this purpose, the applicable partial messages are composed as sum frame partial messages 1, 2, 3 by means of the controller 100 and contain just the payload data of the subscribers of the respective partial route. The subscribers 11, 12, 13, 14; 21, 22, 23; 31 of the respective partial route R1, R2, R3 can each extract their payload data D11, D12, D13, D14; D21, D22, D23; D31 from the respective sum frame partial message 1, 2, 3 and/or write their payload data D11, D12, D13, D14; D21, D22, D23; D31 to the sum frame partial message 1, 2, 3.

The routing structure for the exemplary embodiment of FIG. 2B therefore has multiple partial routes R1, R2, R3. These partial routes R1, R2, R3 cover practically the entire network 101—corresponding to the entire mechatronic system 10. What is not shown, but able to be included by the disclosure, is also that the controller 100 is part of each of the partial routes R1, R2, R3 or part of one or more of the partial routes R1, R2, R3. It is likewise not shown that the payload data D11, D12, D13, D14; D21, D22, D23; D31 can also comprise payload data of the controller 100, which are not explicitly indicated; these payload data can be any data of the controller 100, such as for example setpoint values, actual values or sensor data, that are communicated to one or more subscribers 11, 12, 13, 14; 21, 22, 23; 31. The payload data of the controller 100 and/or, generally, the payload data D11, D12, D13, D14; D21, D22, D23; D31 of the subscribers can also be return channel data that are communicated in the reverse direction, such as for example actual values from subscribers that can be used for open-loop and/or closed-loop control and/or pilot control of the subscribers 11, 12, 13, 14; 21, 22, 23; 31. All in all, the sum frame partial messages 1, 2, 3 shown, which relate to the respective associated partial route R1, R2, R3, can collectively reproduce the payload data D11, D12, D13, D14; D21, D22, D23; D31 of all the subscribers 11, 12, 13, 14; 21, 22, 23; 31 of the entire network 101 or of the entire mechatronic system 10.

In the exemplary embodiment shown, the controller 100 acts as message sender, for example, and can be e.g. a publisher based on the publish/subscribe communication model or a master of a master/slave fieldbus architecture. The controller 100 generates sum frame partial messages 1, 2, 3 and sends them via the respective associated partial routes R1, R2, R3 to the addressed subscribers 11, 12, 13, 14; 21, 22, 23; 31. The sum frame partial messages 1, 2, 3 pass through the routing structure to the respective addressed subscribers 11, 12, 13, 14; 21, 22, 23; 31 without alteration. Conversely, it is also conceivable for the controller 100 as message sender to generate a message for all the subscribers 11, 12, 13, 14; 21, 22, 23; 31 with all the payload data D11, D12, D13, D14; D21, D22, D23; D31, to communicate said message to the switch 90 via the network connection and, at said switch, to restructure, break down or fragment the message into the sum frame partial messages 1, 2, 3—as shown and as explained above. According to the disclosure, the sum frame partial messages are composed in accordance with the partial routes R1, R2, R3. In particular, in the exemplary embodiment shown, a message (this can formally also be regarded as a sum frame partial message, which has all the payload data D11, D12, D13, D14; D21, D22, D23; D31 of all the subscribers 11, 12, 13, 14; 21, 22, 23; 31, however) is transmitted and is restructured in accordance with the partial routes R1, R2, R3, and the restructured sum frame partial messages 1, 2, 3 with the respective payload data D11, D12, D13, D14; D21, D22, D23; D31 are forwarded to the respective subscribers 11, 12, 13, 14; 21, 22, 23; 31 addressed therein.

The routing structure shown has at least three linear sections R1, R2, R3, the subscribers of which are arranged in sequential succession, wherein the linear section R1 has a line start subscriber 11 and a line end subscriber 14, the linear section R2 has a line start subscriber 21 and a line end subscriber 23, and the linear section R3 consists of just one subscriber 31 (this then forms the line end subscriber 31 and the line start subscriber 31 simultaneously). The sum frame partial messages 1, 2, 3 assigned to the respective routes R1, R2, R3 pass through the respective linear section R1, R2, R3 without alteration and are likewise routed by each line subscriber 11, 12, 13, 14; 21, 22, 23; 31 without alteration.

FIG. 3 shows an abstracted, schematic depiction of a mechatronic system 10 in a block diagram, said system having a complex network topology with multiple star sections and multiple linear sections. The star sections are formed by two switches 90, 91. There are—as always with a complex network topology—multiple to a multiplicity of options for splitting the routing structure into partial routes in this case. First, the mechatronic system has, besides the aforementioned components, the further subscribers 11, 12, 13, 14; 21; 31, 32, 33; 41; 51; 61; 71, 72; 81, 82. If it is assumed that the controller 100 is the sender of any messages or sum frame partial messages, then—in order to cover the entire network 101—a sum frame partial message needs to be sent in the direction of each directly adjacent subscriber 11, 21 in each case. This will be discussed in even more detail later on. The controller 100 can form a node that is a star section with the two star branches in the direction of the subscriber 11 and the subscriber 21 and possibly further subscribers, not shown here, if e.g. said controller has incorporated an applicable network infrastructure component, such as e.g. a network switch—as is also possible for any other subscriber.

Figure 5A:
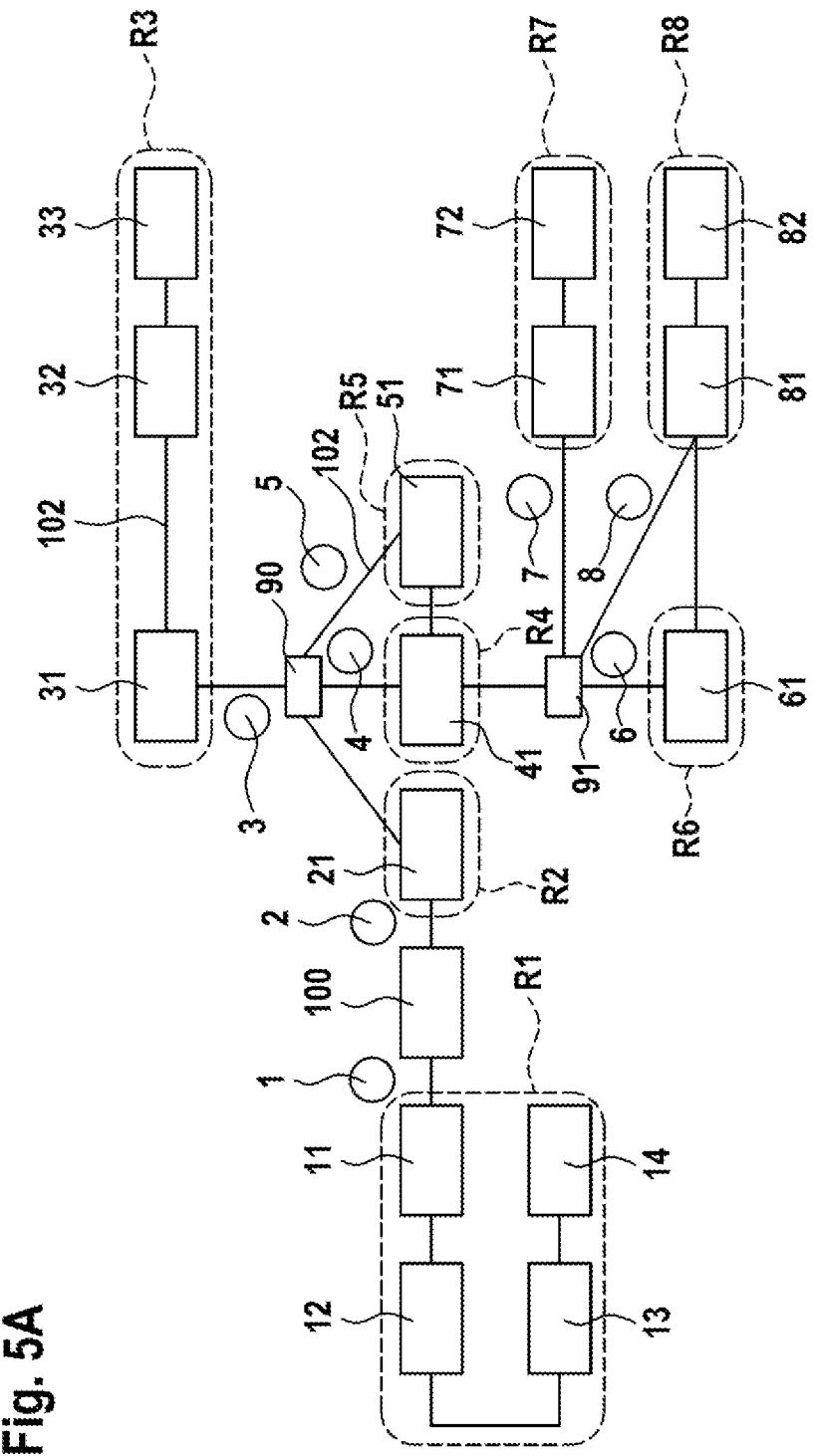
FIG. 5A shows a depiction of the mechatronic system shown in FIG. 3 with routing points at the applicable branch locations and highlighting of partial routes available according to the disclosure.

Referring to figure 5A, the controller 100 sends its generated sum frame partial messages 1, 2, 3, 4, 5, 6, 7, 8 via the associated branch points 1, 2, 3, 4, 5, 6, 7, 8, depending on the chosen method used to generate sum frame partial messages 1, 2, 3, 4, 5, 6, 7, 8. This will be discussed in even more detail later on. In this text, the reference signs 1, 2, 3, 4, 5, 6, 7, 8 and 1', 2', 3', 4', 5', 6', 7', 8' are used for messages and branch points interchangeably, the reference being obtained from the respective context. In the event of doubt, both branch points and sum frame partial messages or messages are covered thereby. However, it should be noted that, depending on the communication model, a different configuration of sum frame partial messages can be obtained at one and the same branch point.

In the design in FIG. 5A, the disclosure uses a configurable routing structure that is used to route the messages 1, 2, 3, 4, 5, 6, 7, 8. The configurable routing structure is flexible and, in the embodiment shown, contains the eight partial routes R1, R2, R3, R4, R5, R6, R7, R8. These 8 partial routes R1, R2, R3, R4, R5, R6, R7, R8 cover the entire network 101, in the sense that each subscriber 11, 12, 13, 14; 21; 31, 32, 33; 41; 51; 61; 71, 72; 81, 82, if necessary including the subscriber 100, is a subscriber of at least one of the eight partial routes R1, R2, R3, R4, R5, R6, R7, R8. Specifically, the partial route R1 covers a linear section that comprises the subscriber 11 as line start subscriber, the subscriber 14 as line end subscriber and, in between, the two subscribers 12, 13. Generally, it goes without saying that closed, in particular ring, topologies are also covered by the disclosure; a closed ring topology of this kind would be obtained in the exemplary embodiment shown if the line end subscriber 14 had a direct network connection to the controller 100. Exemplary embodiments of this kind are generally also included. The partial route R2 consists of the subscriber 21, the partial route R3 consists of a linear section with the subscribers 31, 32, 33, the partial route R4 consists of just the subscriber 41, the partial route R5 consists of the subscriber 51 (which is also shown additionally connected to the subscriber 41 via a physical network connection, and can also communicate directly with this subscriber, however).

The partial route R6 has just the subscriber 61, the partial route R7 has a linear section comprising the two subscribers 71, 72 and, finally, the partial route R8 furthermore has a linear section comprising the two subscribers 81, 82.

Figure 5B:
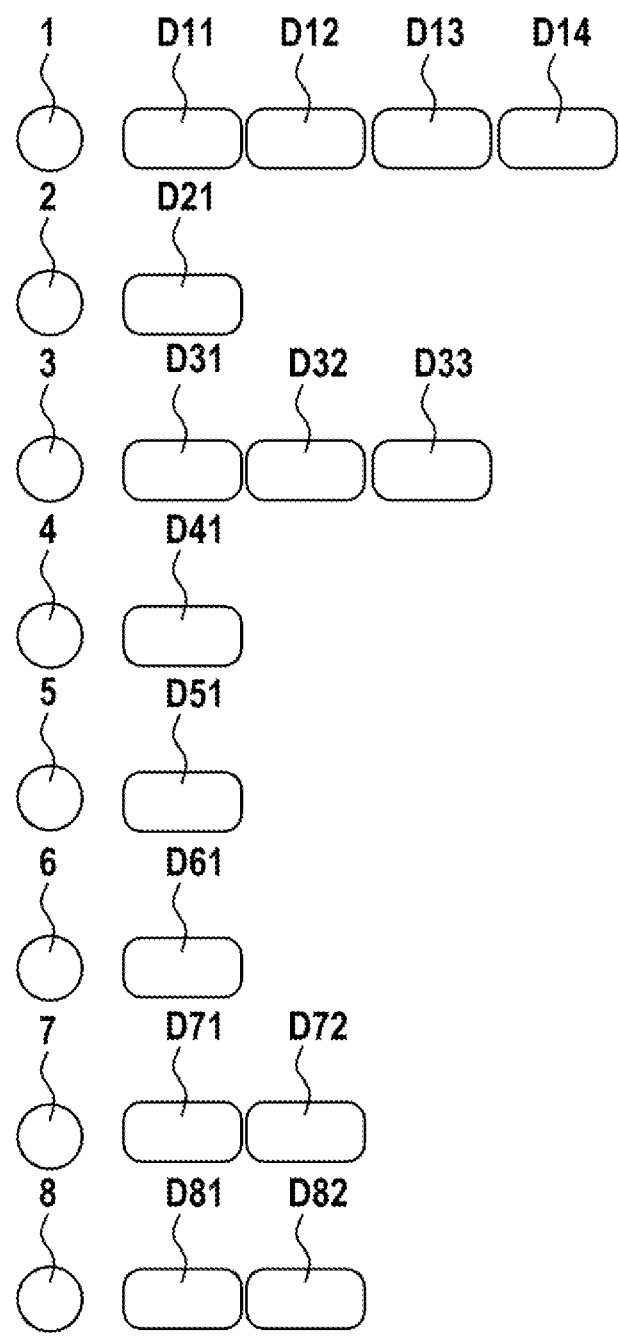
FIG. 5B shows the routing points from FIG. 5A with an indication of the respective associated message structure, wherein the routed sum frame partial messages pass through the routing structure without alteration.

The description below is provided while referring to FIGS. 5A and 5B simultaneously; FIG. 5B shows the composition of the sum frame partial messages 1, 2, 3, 4, 5, 6, 7, 8 assigned to the respective partial routes R1, R2, R3, R4, R5, R6, R7, R8 on the assumption that the respective sum frame partial messages 1, 2, 3, 4, 5, 6, 7, 8 are routed within the network 101 without alteration, or forwarded by the subscribers. The controller 100 as message sender then uses the branch point 1 to send the sum frame partial message 1, which contains (see FIG. 5B) the payload data D11, D12, D13, D14 of the subscribers 11, 12, 13, 14. This sum frame partial message 1 is composed in accordance with the partial route R1 and contains just the aforementioned payload data D11, D12, D13, D14.

It is therefore routed via the partial route R1, and the subscribers 100, 11, 12, 13, 14 of the partial route R1 can extract their respective payload data D11, D12, D13, D14 from this sum frame partial message 1 and/or write their payload data D11, D12, D13, D14 to the sum frame partial message 1. In the communication model to which FIG. 5B relates, the controller 100 uses the branch point 2, and hence uses the subscriber 21, to send the sum frame partial messages 2, 3, 4, 5, 6, 7, 8. The sum frame partial message 2 has just the payload data D21 of the subscriber 21. The sum frame partial message 3 has just the payload data D31, D32, D33 of the subscribers 31, 32, 33, the sum frame partial message 4 has just the payload data D41 of the subscriber 41, the sum frame partial message 5 has just the payload data D51 of the subscriber 51, the sum frame partial message 6 has just the payload data D61 of the subscriber 61, the sum frame partial message 7 has just the payload data D71, D72 of the subscribers 71, 72 and, finally, the sum frame partial message 8 has just the payload data D81, D82 of the subscribers 81, 82.

The aforementioned sum frame partial messages 1, 2, 3, 4, 5, 6, 7, 8 are routed as follows (instead of sum frame partial message, just the term partial message is temporarily used hereinbelow): the partial message 1 directly from the controller 100 via the subscriber 11 to the destination route R1, partial message 2 directly from the controller 100 via the subscriber 21 to the destination route R2, partial message 3 via the partial route R2 and the network switch 90 to the destination partial route R3, partial message 4 via the partial route R2 and the network switch 90 to the destination partial route R4, partial message 5 via partial route R2 and the network switch 90 to the destination partial route R5, partial message 6 via the partial route R2, the network switch 90, the partial route R4 and the network switch 91 to the destination partial route R6 with the just one subscriber 61, partial message 7 via partial route R2, the network switch 90, partial route R4 and the network switch 91 to the destination partial route R7 and, finally, the partial message 8 via the partial route R2, the network switch 90, the partial route R4 and the network switch 91 to the destination partial route R8.

Figure 5C:
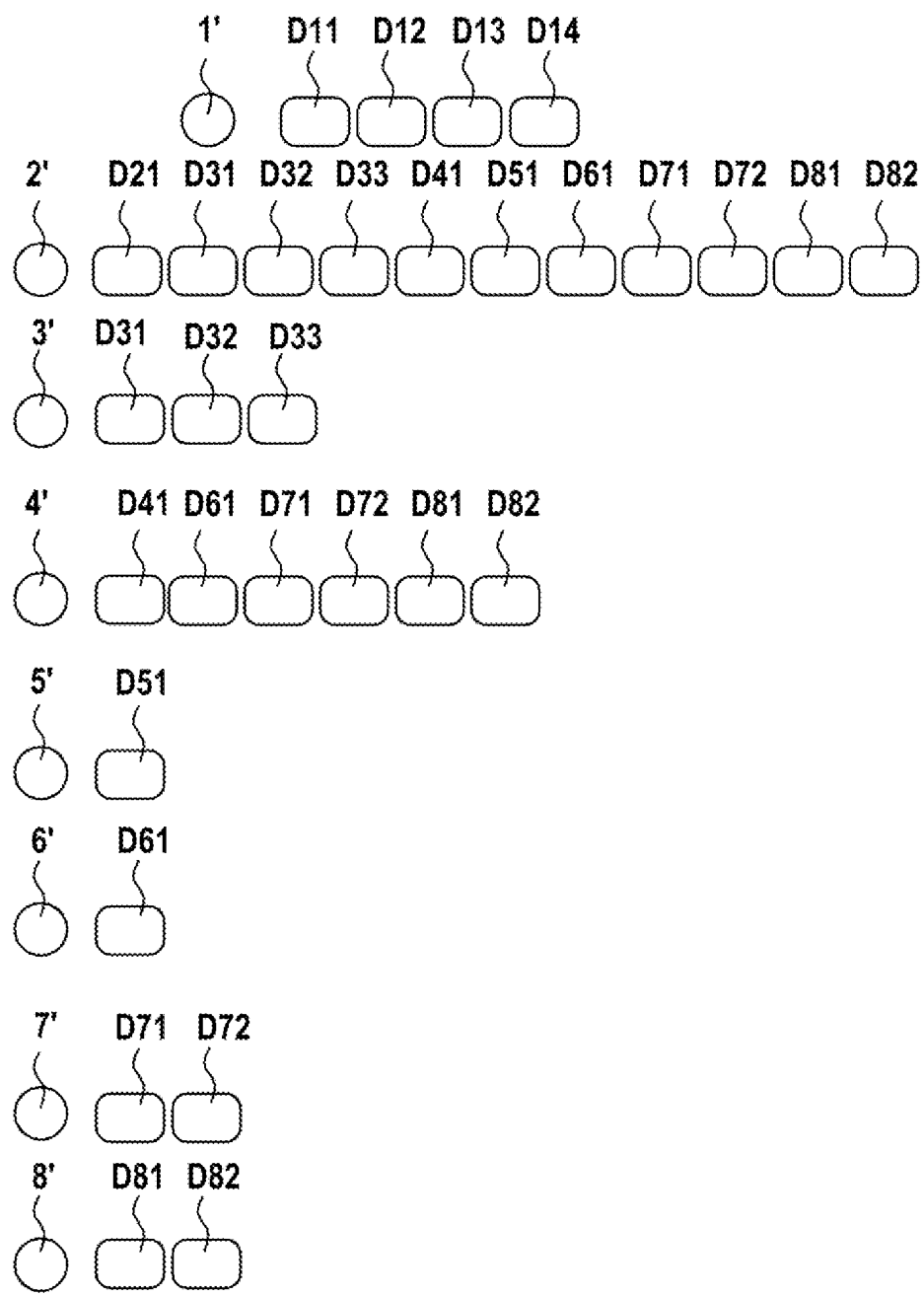
FIG. 5C shows the routing points from FIG. 5A with an indication of the respective associated message structure of the sum frame partial messages, these being restructured.

The description below is provided while referring to FIGS. 5A and 5C simultaneously, specifically on the assumption that sum frame partial messages 1' to 8' are restructured at the network infrastructure components 90, 91 of the routing structure. The controller 100 or the message sender composes the sum frame partial message 1' on the basis of the destination partial route R1 with the payload data D11, D12, D13, D14 of the subscribers 11, 12, 13, 14 and sends it via the connection to the line start subscriber 11 of the linear section of the partial route R1 to the destination partial route R1 (in FIG. 5A, the branch points 1, 2, 3, 4, 5, 6, 7, 8 are shown without the ""-prime—to assist legibility, and therefore the sum frame partial messages/branch points 1', 2', 3', 4', 5', 6', 7', 8' below refer to the sum frame partial messages/branch points 1, 2, 3, 4, 5, 6, 7, 8 presented there, unless stated otherwise below and the context reveals otherwise). Since the partial route R1 has no node points and other branches apart from its linear structure, the associated sum frame partial message 1' is not fragmented further.

In the present communication mode, the sum frame partial message 2' has payload data D21; D31, D32, D33; D41; D51; D61; D71, D72; D81, D82 of all the subscribers 21; 31, 32, 33; 41; 51; 61; 71, 72; 81, 82 of the right-hand network segment in FIG. 5A and is restructured in accordance with the branches or node points 90, 91 as described below. As a result, the controller 100 in the exemplary embodiment shown needs to transmit just a single sum frame partial message 2' with the payload data D21; D31, D32, D33; D41; D51; D61; D71, D72; D81, D82 of the subscribers 21; 31, 32, 33; 41; 51; 61; 71, 72; 81, 82 into the network segment on the right in FIG. 5A for each cycle. This sum frame partial message 2' is routed via the subscriber 21 and the partial route R2 to the network switch 90 at first; during the process, the subscriber 21 takes or writes its payload data D21. In the network switch 90, the sum frame partial message 2' is used to form the sum frame partial message 3', which is routed via the subscriber 31 to the partial route R3; this sum frame partial message 3' has just the payload data D31, D32, D33, and is formed from the sum frame partial message 2' by breaking it down. In the network switch 90, it is then possible to form either the sum frame partial messages 4', 5', 6', 7', 8' directly or just the sum frame partial message 5' for the subscriber 51 connected directly to the network switch 90 and a separate, summary sum frame partial message 4', which can then summarily have the payload data D41; D61; D71, D72; D81, D82 for the subscribers 41; 61; 71, 72; 81, 82, and which can then be broken down further in the network switch 91 to produce the applicable sum frame partial messages 6', 7', 8'. Generally, the sum frame partial messages with the payload data for the subscribers downstream of an infrastructure component, such as for example a network switch, can be structured and generated at this infrastructure component. According to the exemplary embodiment in FIG. 5A in conjunction with FIG. 5C, the sum frame partial message 4' contains the payload data D41; D61; D71, D72; D81, D82. The subscriber 41 of the partial route R4 takes/writes its payload data D41. The aforementioned, summary sum frame partial message 4' then passes through the network switch 91; there, it is restructured/broken down further, specifically into the individual sum frame partial messages 6', 7', 8' for the final destination subscribers 61; 71, 72; 81, 82, which are not followed by any further network segments or network infrastructure components. The sum frame partial message 6' contains the payload data D61 for the intended end subscriber 61 of the partial route R6; the sum frame partial message 7' contains the payload data D71, D72 for the intended linear section subscribers 71, 72 of the partial route R7. Finally, the sum frame partial message 8' contains the payload data D81, D82 for the addressed linear section subscribers 81, 82 of the partial route R8. In this way, the second routing method, proposed according to the disclosure, is used to efficiently and deterministically route all the payload data D11, D12, D13, D14; D21; D31, D32, D33; D41; D51; D61; D71, D72; D81, D82 to the addressed subscribers 11, 12, 13, 14; 21; 31, 32, 33; 41; 51; 61; 71, 72; 81, 82.

Figure 4:
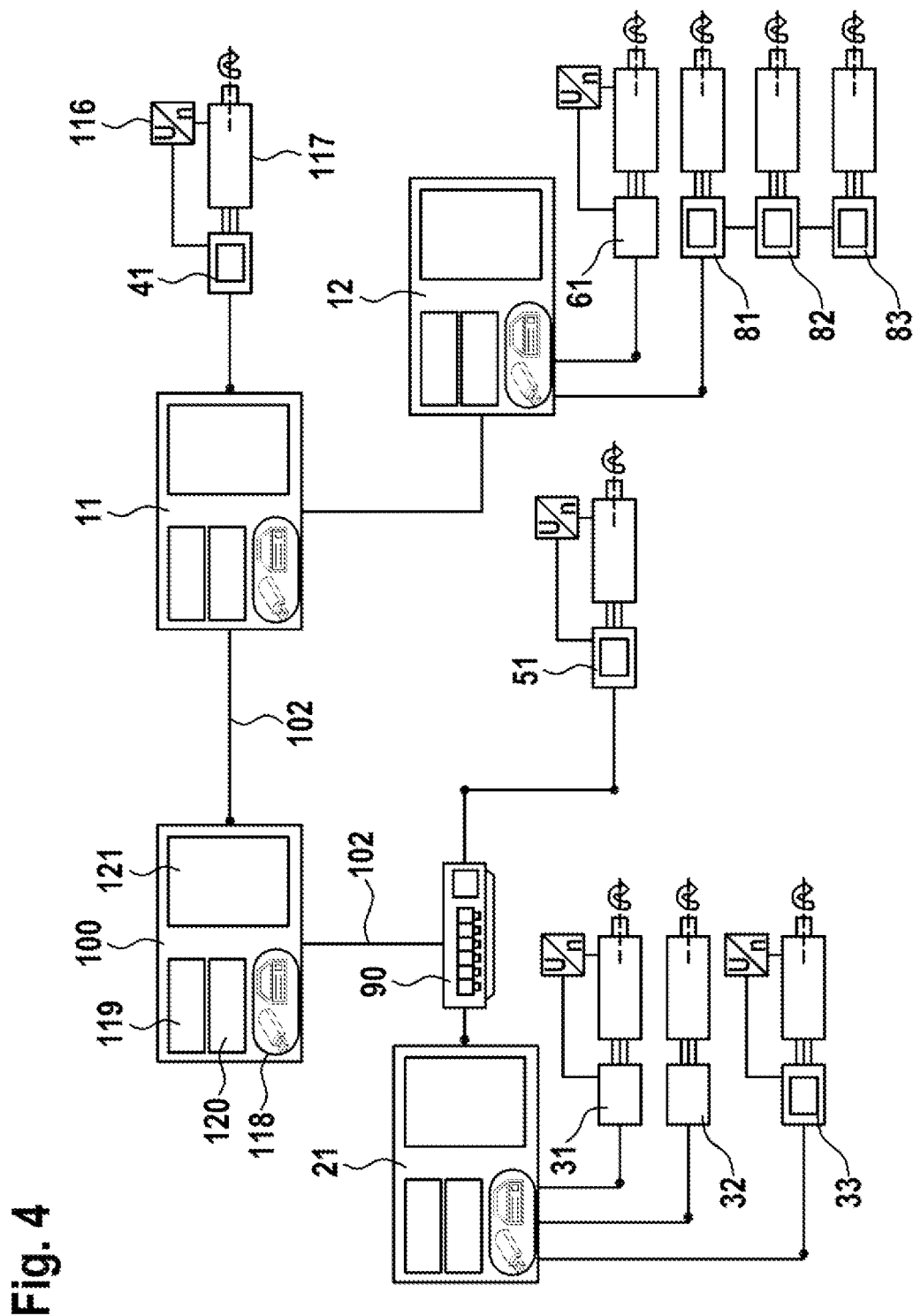
FIG. 4 shows a mechatronic system with multiple star sections and linear sections, wherein the network subscribers are depicted as industrial automation controllers, industrial automation drives and switches.

FIG. 4 shows a somewhat more complex mechatronic system with multiple star sections and linear sections, wherein the network subscribers are depicted as industrial automation controllers, drives and (partially integrated) switches. The controller 100 can be a head controller, for example, which simultaneously acts as a switch and connects the network subscriber 11 and the network switch 90 via the communication connection 102. The network subscriber 11 is in the form of a controller according to the disclosure that directly applies feedback 116 to a drive 41 with an integrated control component and a connected servomotor 117. The controller 11 can have an integrated network switch (not shown) and incorporate the controller 12 into the network 101 by means of this network switch as well. The controller 12 acts on a total of four drive controllers 61; 81, 82, 83, which each drive an electric motor/servomotor. A particularly flexible configuration option shown, which the disclosure readily comprises, is that the drive controller 61 and the drive controller 81 are directly connected to the controller 12. The drive controller 81 acts as controller and then applies the forwarded sum frame partial message intended for it (not shown explicitly in FIG. 4) to the further, cascaded drives 82, 83. On the other side of the network, there is, via the network switch 90, a controller 21 with three connected drive controllers 31, 32, 33, each having an actuated electric motor, and, on the other side, a drive controller 51 with an integrated controller, and an electric motor connected thereto, that is connected to the network switch 90 directly. All the exemplary embodiments and behaviors and also methods and method components listed herein are fully applicable and transferable to this industrial automation system 10. In particular, the payload data (not shown explicitly in FIG. 4) in the exemplary embodiment relate to realtime data concerning the industrial automation system, in particular open-loop and/or closed-loop control data. These open-loop and/or closed-loop control data are communicated between the subscribers 100, 11, 41, 12, 61, 81, 82, 83, 90, 21, 31, 32, 33. The communication architecture can be based on a fieldbus architecture or a TSN architecture according to IEEE 802.1, in particular using a publish/subscribe communication model according to OPC-UA.

Finally, FIG. 6 shows an example of the composition of a message data structure 103 presented in temporally resolved fashion as a timeslot message in the longitudinal direction. This message data structure 103 is used to communicate payload data D11, D12, D13, D14 between subscribers 11, 12, 13, 14 of a network 101 along a preconfigurable route R1 assigned to the message data structure 103 (see FIG. 5A in conjunction with FIG. 5B, for example). The communication takes place by means of a method according to the disclosure, described herein, and the network 101 has multiple components of a mechatronic system. The message data structure 103 shown has a configurable payload data section 104 that contains the payload data D11, D12, D13, D14 just from subscribers 100, 11, 12, 13, 14 of the assigned route R1 (again see FIG. 5A in conjunction with FIG. 5B). As can be seen from FIG. 6, the payload data are in a dedicated, configurable payload data section 104 deterministically placed permanently in the message data structure 103 (this is consistent with an allocated timeslot for the payload data D11, D12, D3, D14 and further payload data. This is because the configurable payload data section 104 (not shown to scale) is so large that it can accommodate a multiplicity of payload data in one message (data packet); in this regard, an unfilled payload data subsection 113 is shown here in exemplary fashion, said payload data subsection adjoining an area that contains already written payload data D11, D12, D13, D14 and forming the entire configurable payload data section 104 together with said area. The payload data D11, D12, D13, D14 are positioned in the assigned timeslot 104 deterministically and in randomly accessible fashion, so that they can be written and read at any time. Preferably, there is also provision for a fixed length for one payload datum D11, which length can also be configured or can also be adapted online, for example.

Specifically, the message data structure 103 (based on the Ethernet message standard (stack)) also has the following components, according to the disclosure: the data structure 103 normally begins with a preamble 105, which contain general information about the synchronization and identification of the message start according to the disclosure. This is followed by a start identification as message start 106, followed by the MAC address 107 of the recipient and the MAC address 108 of the sender. These are used according to the disclosure to determine the routing of the sum frame partial message whose message data structure 103 is shown here. Optionally, there is also provision for a VLAN or 802.1Q tag 109, which is used when using virtual networks (VLAN) and into which switches present can insert a VLAN tag according to the IEEE 802.1Q standard if necessary. There follows an EtherType 110 timeslot, which indicates the service access point as type information. Finally, before the configurable payload data section 104, there follows the TCP header 112, which contains the TCP data on the OSI layer 4. This is followed by the checksum 114 and packet interspace 115; the integrity and authenticity of the included payload data D11, D12, D13, D14, inter alia, are ensured in the checksum 114 as sum frame partial message checksum.

LIST OF REFERENCE SIGNS 1 message/branch point
2 message/branch point
3 message/branch point
4 message/branch point
5 message/branch point
6 message/branch point
7 message/branch point
8 message/branch point
1' message/branch point
2' message/branch point
3' message/branch point
4' message/branch point
5' message/branch point
6' message/branch point
7' message/branch point
8' message/branch point
10 mechatronic system
11 subscriber
12 subscriber
13 subscriber
14 subscriber
21 subscriber
22 subscriber
23 subscriber
31 subscriber
32 subscriber
33 subscriber
41 subscriber
51 subscriber
61 subscriber
71 subscriber
72 subscriber
81 subscriber
82 subscriber
83 subscriber
90 subscriber/network switch
91 subscriber/network switch
100 subscriber/controller
101 network
102 communication connection
103 Ethernet message (packet)/message data structure
104 configurable payload data section
105 preamble
106 message start
107 MAC address recipient
108 MAC address sender
109 802.1Q tag (optional)
110 EtherType
111 IP header
112 TCP header
113 payload data subsection
114 checksum
115 packet interspace
116 feedback/transducer
117 servomotor
118 mass memory (hard disk/SSD/USB memory stick)
119 integrated logic controller
120 integrated path controller
121 display
122 electric motor
Dnn payload data
R1-R8 partial route

What is claimed is:

1. A method for communication between subscribers of a network, the network having multiple components of a mechatronic system, including controllers and drive controllers of an industrial automation installation, the method comprising:

transmitting messages including payload data between the subscribers via the network, at least one of logical communication connections and physical communication connections between the subscribers of the network being used to transmit the messages, the messages including a sum frame message that combines payload data of multiple of the subscribers, the sum frame message being transmitted to the subscribers of the network;

routing the messages using a configurable routing structure, the configurable routing structure containing at least one partial route that covers only a subset of the subscribers of the network;

routing at least one partial message of the messages pertaining to the at least one partial route via the at least one partial route, the at least one partial message including a sum frame partial message that contains respective payload data only from subscribers of the at least one partial route; and at least one of:
  extracting, with the subscribers of the partial route, the respective payload data from the sum frame partial message; and
  writing, with the subscribers of the partial route, the respective payload data to the sum frame partial message.

2. The method according to claim 1, wherein:
the payload data comprises realtime data relating to the mechatronic system, including at least one of open-loop control data and closed-loop control data, which are communicated between subscribers in real time; and the communication architecture is at least one of (i) a fieldbus architecture, (ii) a fieldbus architecture according to IEC 61158, (iii) a master-slave architecture, (iv) master-slave architecture according to SERCOS IEC 61491, (v) a time-sensitive networking (TSN) architecture according to IEEE 802.1, (vi) a TSN architecture using a publish-subscribe communication model according to Open Platform Communication-Unified Architecture (OPC-UA), and (vii) a TSN architecture having multicast or unicast incarnation.

3. The method according to claim 1, wherein:

the configurable routing structure has multiple partial routes that collectively cover one of (i) all of the subscribers of the network and (ii) a subset of the subscribers corresponding to a predetermined network segment; and respective sum frame partial messages associated with each of the multiple partial routes can collectively reproduce payload data of one of (i) all of the subscribers of the network and (ii) the subset of the subscribers corresponding to the predetermined network segment.

4. The method according to claim 3 further comprising:

generating the respective sum frame partial messages with a message sender, the message sender being one of (i) a publisher based on a publish-subscribe communication model, (ii) a master of a master-slave fieldbus architecture, and (iii) a server of established client-server connections; and sending the respective sum frame partial messages, with the message sender, to addressed subscribers of the subscribers of the network via respective associated partial routes of the multiple partial routes.

5. The method according to claim 4, wherein the respective sum frame partial messages pass through the configurable routing structure to the addressed subscribers without alteration.

6. The method according to claim 4 further comprising:

restructuring the respective sum frame partial messages, with network infrastructure components of the configurable routing structure, in accordance with the multiple partial routes, the restructuring including at least one of breaking down, fragmenting, and recombining according to payload data of the addressed subscribers; and forwarding, after the restructuring, the respective sum frame partial messages, in each case using a store-and-forward method, with the payload data to the addressed subscribers.

7. The method according to claim 4 further comprising:

transmitting at least one of (i) the configurable routing structure and (ii) the partial routes with a configuration of the respective sum frame partial messages to all subscribers of the network, wherein the at least one of (i) the configurable routing structure and (ii) the partial routes is used for at least one of routing, extracting, and writing the payload data.

8. The method according to claim 7 further comprising:

determining, in an automated fashion, the configuration of the respective sum frame partial messages with a configuration module of the network using the configurable routing structure, the configuration including at least one of (i) a composition of the respective sum frame partial messages and (ii) transmission times of the respective sum frame partial messages; and communicating, with the configuration module of the network, the at least one of (i) the configurable routing structure and (ii) the partial routes.

9. The method according to claim 1 further comprising at least one of:

prescribing, by a user, the configurable routing structure; and ascertaining the configurable routing structure, in an at least partially automated fashion, at runtime, with subscriber neighborhood detection using Link Layer Discovery Protocol (LLDP).

10. The method according to claim 1, wherein the configurable routing structure has at least one of:

at least one linear section including at least one of (i) a line end subscriber and (ii) a line start subscriber and including subscribers arranged in sequential succession; and at least one star section including star branches having subscribers connected to a node in a star shape, the node being realized by at least one of a network infrastructure component, a publisher based on a publish-subscribe communication model, a master of a master-slave fieldbus architecture, and a server of established client-server connections.

11. The method according to claim 10 further comprising at least one of:

routing, by each line subscriber in the at least one linear section, sum frame partial messages that pass through the at least one linear section, without alteration; and routing sum frame partial messages at the node to one of the star branches without alteration;

restructuring and routing sum frame partial messages at the node to one of the star branches, the restructuring including at least one of breaking down, fragmenting, and recombining according to payload data of addressed subscribers.

12. The method according to claim 1, wherein a message data structure for communicating payload data between the subscribers of the network along, the message data structure being assigned a preconfigurable route, the message data structure having a configurable payload data section that contains the payload data only from subscribers of the assigned preconfigurable route.

13. A mechatronic system, the mechatronic system being an industrial automation system, the mechatronic system comprising:

components; and controllers and drive controllers configured to communicate payload data originating from the components of the mechatronic system, the controllers and drive controllers configured to:

transmit messages including payload data between the subscribers via the network, at least one of logical communication connections and physical communication connections between the subscribers of the network being used to transmit the messages, the messages including a sum frame message that combines payload data of multiple of the subscribers, the sum frame message being transmitted to the subscribers of the network;

route the messages using a configurable routing structure, the configurable routing structure containing at least one partial route that covers only a subset of the subscribers of the network;

route at least one partial message of the messages pertaining to the at least one partial route via the at least one partial route, the at least one partial message including a sum frame partial message that contains respective payload data only from subscribers of the at least one partial route; and at least one of:
- extract, with the subscribers of the partial route, the respective payload data from the sum frame partial message; and
- write, with the subscribers of the partial route, the respective payload data to the sum frame partial message.

14. A machine controller of a mechatronic system for communication between subscribers of a network, the network having multiple components of a mechatronic system, including controllers and drive controllers of an industrial automation installation, the machine controller comprising:

a controller configured to:
- transmit messages including payload data between the subscribers via the network, at least one of logical communication connections and physical communication connections between the subscribers of the network being used to transmit the messages, the messages including a sum frame message that combines payload data of multiple of the subscribers, the sum frame message being transmitted to the subscribers of the network;
- route the messages using a configurable routing structure, the configurable routing structure containing at least one partial route that covers only a subset of the subscribers of the network;
- route at least one partial message of the messages pertaining to the at least one partial route via the at least one partial route, the at least one partial message including a sum frame partial message that contains respective payload data only from subscribers of the at least one partial route; and at least one of:
- extract, with the subscribers of the partial route, the respective payload data from the sum frame partial message; and
- write, with the subscribers of the partial route, the respective payload data to the sum frame partial message, wherein the machine controller at least one of (i) provides for a configuration or at least partially automated ascertainment of the configurable routing structure, (ii) obtains the configuration from the network, and (iii) communicates or distributes the configuration in the network.

15. The machine controller of claim 14, wherein the machine controller executes a computer program stored on a non-transitory computer readable medium.

* * * * *